United States Patent [19]
Akiyama et al.

[11] Patent Number: 5,812,663
[45] Date of Patent: Sep. 22, 1998

[54] DATA REPRODUCING DEVICE

[75] Inventors: Ryota Akiyama; Makoto Yoshioka, both of Kawasaki, Japan

[73] Assignee: Fujitsu Limited, Kawasaki, Japan

[21] Appl. No.: 570,016

[22] Filed: Dec. 14, 1995

[30] Foreign Application Priority Data

Dec. 29, 1994 [JP] Japan ................................. 6-341068

[51] Int. Cl.⁶ ................................................. H04K 1/00
[52] U.S. Cl. ................................................. 380/4; 380/25
[58] Field of Search ................................. 380/4, 23, 25

[56] References Cited

U.S. PATENT DOCUMENTS

| | | |
|---|---|---|
| 5,058,162 | 10/1991 | Santon et al. . |
| 5,305,295 | 4/1994 | Chu . |
| 5,371,792 | 12/1994 | Asai et al. ................................. 380/4 |
| 5,513,262 | 4/1996 | van Rumpt et al. ..................... 380/4 |
| 5,563,947 | 10/1996 | Kikinis ..................................... 380/4 |
| 5,596,639 | 1/1997 | Kikinis ..................................... 380/4 |
| 5,636,276 | 6/1997 | Brugger ................................... 380/4 |

FOREIGN PATENT DOCUMENTS

| | | |
|---|---|---|
| 0 460 764 A | 12/1991 | European Pat. Off. . |
| 0 651 391 A | 5/1995 | European Pat. Off. . |
| 0 676 895 A | 10/1995 | European Pat. Off. . |
| 04 318375 A | 3/1993 | Japan . |
| WO 88 02202 A | 3/1988 | WIPO . |
| WO 88 02960 A | 4/1988 | WIPO . |
| WO 94 07332 A | 3/1994 | WIPO . |
| WO 94 18763 A | 8/1994 | WIPO . |

*Primary Examiner*—David C. Cain
*Attorney, Agent, or Firm*—Staas & Halsey

[57] ABSTRACT

In a system for reproducing multimedia data such as enciphered characters, enciphered images, enciphered animation or enciphered sound, an ID is given every time the data are integrated to some extent and the ID and a sector of CD-ROM are made correspond one another so that an access in which a sector has been designated directly for the encoded data can be executed by directing the ID from the outside.

9 Claims, 13 Drawing Sheets

DATA REPRODUCING DEVICE

BACKGROUND OF THE INVENTION

The present invention relates to a method applied to a device in which compressed and encoded data such as moving image data is distributed by a management center in CD-ROM format or communication data format and the distributed data is reproduced by a user who has received the data.

The following process is executed as a procedure for compressing and enciphering the moving image data and storing the data in a mass storage medium such as CD-ROM to be distributed.

First of all, in a providing side of the moving picture data (encoding unit), an original animation is compressed and encoded by a compressing and encoding unit in accordance with standards such as MPEG. After that, the animation is enciphered in an encipherment circuit to be stored in a CD-ROM.

Then, in a end user side (decoding unit), the data is read out of the CD-ROM by using a CD-ROM drive unit. After that, the read out data is decoded by a decoding unit consisting of DES (Data Encryption Standard). For instance, a decoding unit standardized by "FIP'S PUB 46DATA ENCRYPTION STANDARD NIST" can be used as the decoding unit.

Further, the decoded data is expanded by an expansion unit such as an MPEG decoder to be decoded into the original animation.

For data provided in the CD-ROM format, the CD-ROM is accessed per sector in the CD-ROM drive unit. However, it has not been easy to recognize what kind of data is recorded in each sector from the outside, since a list of bits changes when the compressed and encoded data is stored in the CD-ROM.

On the other hand, the concept of a "sector" has not existed in the data obtained through a communication line. Although reproducing the communication data after storing it in a photo-electro magnetic disk and the like has been considered, it has been difficult to recognize in which sector the of photo-electro magnetic disk what kind of data is recorded from the outside. As mentioned hereinbefore, it has been difficult to execute special reproductions such as reproduction from a random data position the user desires(random search), high-speed fast-forward (skip search) or reverse reproduction, when the data has been reproduced from the medium in which the enciphered data was stored, since a corresponding relation between the data and the sector was not clear.

The present invention has been accomplished in consideration of the above-mentioned problems, and has made it possible to execute the reproduction from a place the user desires (random access), the reverse reproduction and the skip search in connection with the compressed and encoded (enciphered) data, since a user ID was set up so as to manage the user ID and the sector by making them correspond to one another.

Further, the 12785 number official report of Patent Disclosure in 1994, the 21760 number official report of Patent Disclosure in 1989, the 21761 number official report of Patent Disclosure in 1989, the 307592 number official report of Patent disclosure in 1993, the 313826 number official report of Patent Disclosure in 1993 and the like indicate the internal constructions of the CD-ROM drive unit.

SUMMARY OF THE INVENTION

The present invention comprises a ID acquisition means for acquiring ID information which was given per block (per sector) from the outside and ID•block number corresponding means for detecting a block number corresponding to the ID information by referring to a corresponding table indicating a corresponding relation between the ID information and the block number. Besides, in the present invention, a readout of the data is directed by readout control means in accordance with the block number acquired by the ID•block number corresponding means, and an output of the readout data is controlled by output control means.

Namely, although the access to the data by hardware is executed per block (per sector) in reality, it will be possible to execute a reverse reproduction, a reverse reproduction and the like from a random position in relation to the compressed and encoded data, if ID is given every time the blocks (sectors) are integrated and the ID and the block (sector) are made to correspond to one another.

Further, the present invention can be provided with permitted information management means for giving a key information for decoding the enciphered data or compressed and encoded data to the decoding means from the outside and registering ID information which has been permitted to be reproduced.

Besides, the data is recorded in convertible type recording medium such as CD-ROM (Compact Disk Read-Only Memory) and a corresponding relation between the sector number and the ID information given per block (for instance, frame) is recorded in the medium. After that, the corresponding relation can be read out from a drive unit of the medium to initialize the ID•block number corresponding means installed on the system in accordance with the data of the corresponding relation.

Further, although the data is described by giving CD-ROM, photo-electro-magnetic disk or magnetic disk as an example in the present invention, the data is not restricted to them and the data which is obtained via a communication path can be substituted for them. Besides, any kind of data such as moving picture, still picture, sound and program in any data form can be substituted for the data.

Besides, the hardware in which an external remote control provided with a infrared transmission unit is combined with an infrared receiver can be used as a construction for acquiring the ID from the outside. For instance, the ID is given per movie or per specific scene as a concrete use example of the system, and accordingly the user can designate the ID number through the remote control.

The decoding means is composed of decoding circuits such as DES (Data Encryption Standard).

In the present invention, it is possible for the user to reproduce a random picture only by designating an ID for the moving picture data which has been compressed and encoded to be recorded in recording medium such as CD-ROM from the outside. The ID•block number corresponding means converts the ID into a sector number on the recording medium, when the ID is inputted via designation means. The output control means accesses the predetermined position on the CD-ROM to read out the data in accordance with the sector number. Then, the data is decoded in the decoding means and converted into a video signal and the like to be displayed on CRT and the like.

As mentioned hereinbefore, it is possible to realize a starting of reproduction and a skip search in accordance with the ID by giving and managing the ID every time the data are integrated to some extent in connection with the compressed and encoded data which has been recorded on the CD-ROM.

Further, although the ID may be given per sector, it is desirable that the ID is given to the sectors which are integrated at a fixed number. Besides, the number of sectors to which one ID is given does not always have to be the same number, and a single CD may be given per scene of movie, every time a plurality of sectors are integrated.

Further, the ID can be given per payload of fixed length in relation to a header, when the data has been obtained via the communication circuit. In this case, the detection of ID can be regarded as a synchronization signal, since the ID will be recorded per fixed length of the data.

DESCRIPTION OF THE PREFERRED EMBODIMENT

The concept of the present invention will be described in accordance with FIG. 1 and FIG. 2.

Figure 1:
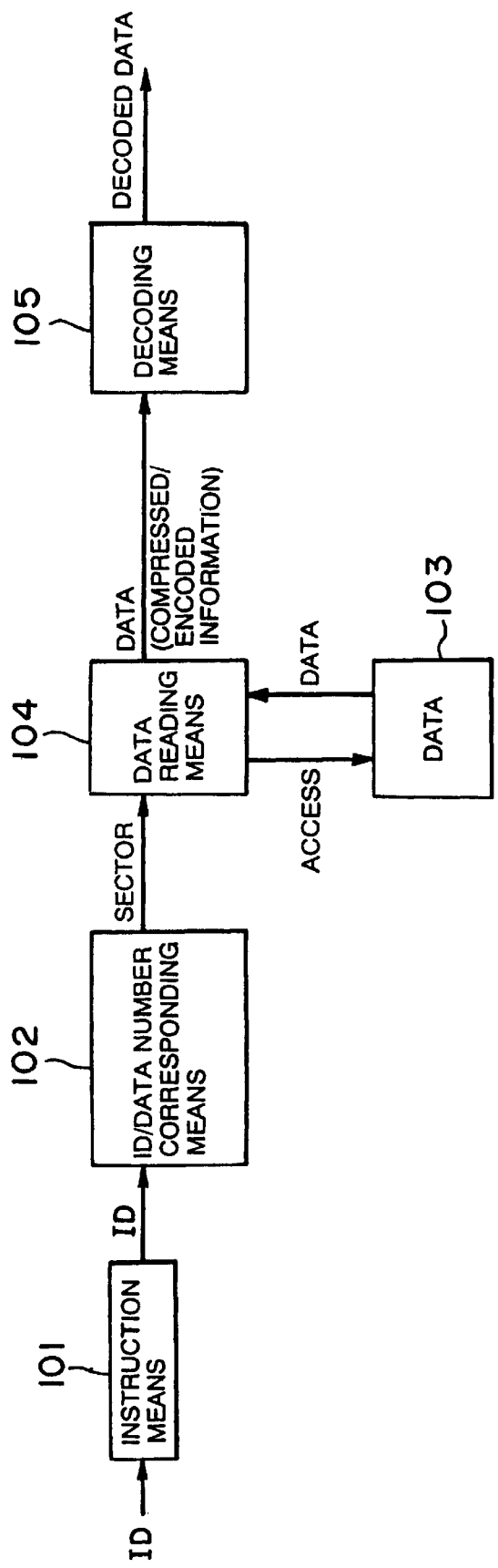
FIG. 1 is a conceptual diagram of the present invention.
Figure 2:
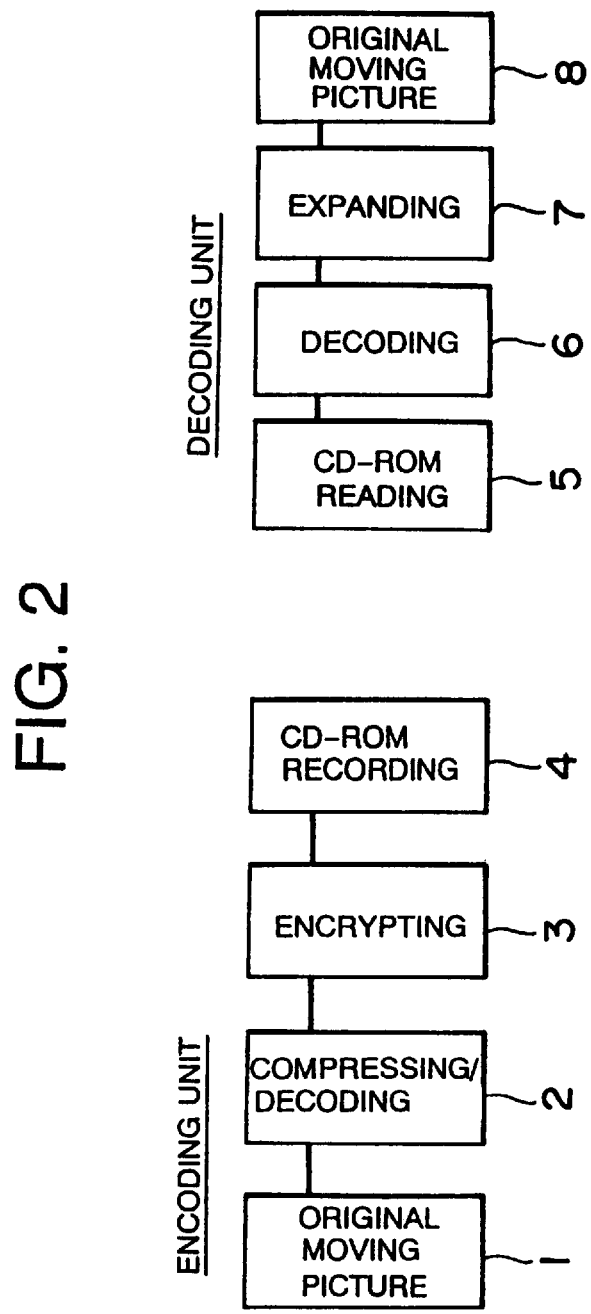
FIG. 2 is an explanatory diagram indicating a process for compressing and encoding moving pictures and decoding the pictures.

FIG. 1 indicates a process of data reproducing system according to the present invention conceptually, and FIG. 2 indicates the present system by dividing the system into a process for encoding and a process for decoding.

As shown in FIG. 2, first of all, in a providing side (encoding unit) of moving picture data, an original moving picture 1 is compressed and encoded by compressing and encoding unit 2 in accordance with a standard such as MPEG. After that, the moving picture 1 is enciphered in encipherment circuit 3 to be stored in CD-ROM 4.

Then, in an end user side (decoding unit), the data is decoded by decoding unit 6 such as DES (Data Encryption Standard) after reading the data from the CD-ROM 4 in CD-ROM drive unit 5. DES standardized by "FIP'S PUB 46DATA ENCRYPTION STANDARD NIST" has been adopted as the decoding unit 6.

Further, the decoded data is expanded by expansion unit 7 such as a MPEG decoder to be restored into an original animation 8.

As shown in FIG. 1, in series of processes mentioned above, the present invention is provided with direction means (101) and ID•data number corresponding means (102) in which the ID and the data number corresponding to the ID are registered. Besides, the data is read out by data readout means (104) in accordance with the data number obtained in the ID•data number corresponding means (102) and the read out data is decoded in decoding means (105).

Figure 3:
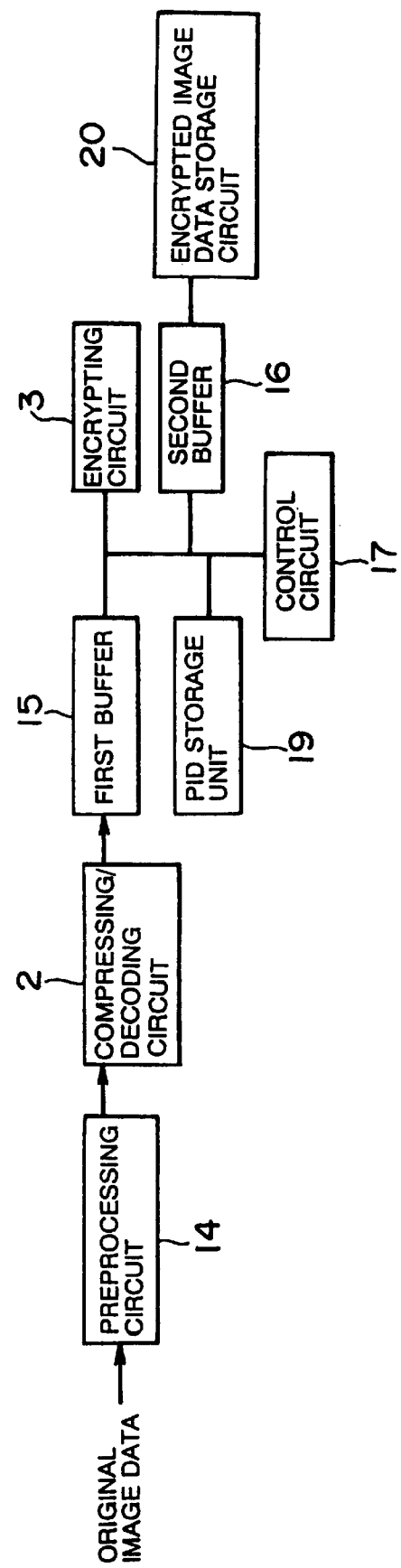
FIG. 3 is a block diagram indicating a encoding system in the embodiment.

FIG. 3 is a block diagram indicating a circuit construction of an encoding device used in the data providing side.

In FIG. 3, a preprocessing unit 14 has a function for digitalizing an original data. A compressing and encoding unit 2 in the next stage has a function for compressing the digitalized original moving picture data in accordance with the standard of MPEG.

A first buffer 15 stores the moving picture data (compressed and encoded data) which has been compressed by the compressing and encoding unit 2. Besides, an encipherment circuit 3 has a function for converting the compressed and encoded data into an enciphered data. Further, although a method for enciphering only the picture data of the moving picture data and a method for enciphering both of the picture data and sound data exist as an enciphering process executed by the encipherment circuit 3, both of the methods can be executed by the encipherment circuit 3.

Besides, the enciphering process is executed per block (per frame) in the compressed and encoded order.

PID (payload ID) which is given every time a fixed number of moving picture data are integrated is stored in PID storage unit 19, and PID information read out of the PID storage unit 19 is transmitted to a second buffer 16 by control circuit 17 as a portion of header information.

The second buffer 16 stores the enciphered frame moving picture, and an enciphered picture data storage circuit 20 has a function for assembling the enciphered frame moving picture data as an enciphered picture data, namely, a function for assembling a header, frame length information and enciphered/compressed picture data as one unit of frame data.

Then, the processing procedures of the present embodiment will be described in accordance with the flowchart of FIG. 4.

Figure 5:
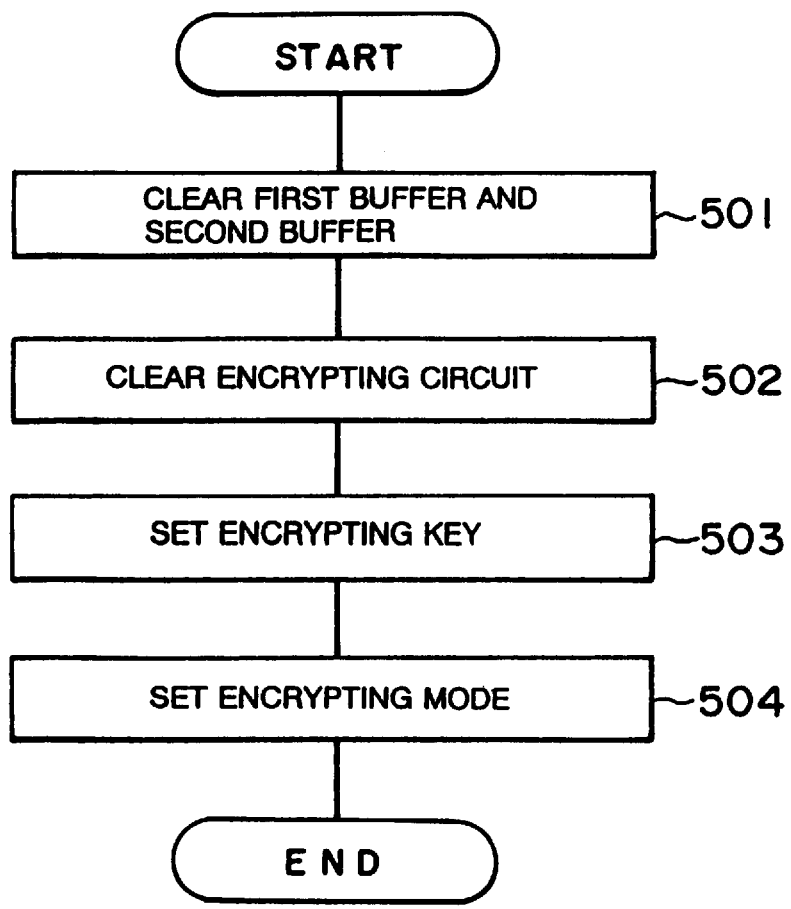
FIG. 5 is a flowchart indicating an initialization process of a control circuit in the embodiment.

First of all, the control circuit 17 executes an initialization process (Step 401). As shown in the flowchart of FIG. 5, the contents of first buffer 15 and second buffer 16 are cleared in connection with the initialization process(Step 501). Then, the encipherment circuit 3 is cleared and an enciphered key is set up on the encipherment circuit 3 to determine a logic of enciphered mode for enciphering the data (Step 504).

Figure 4:
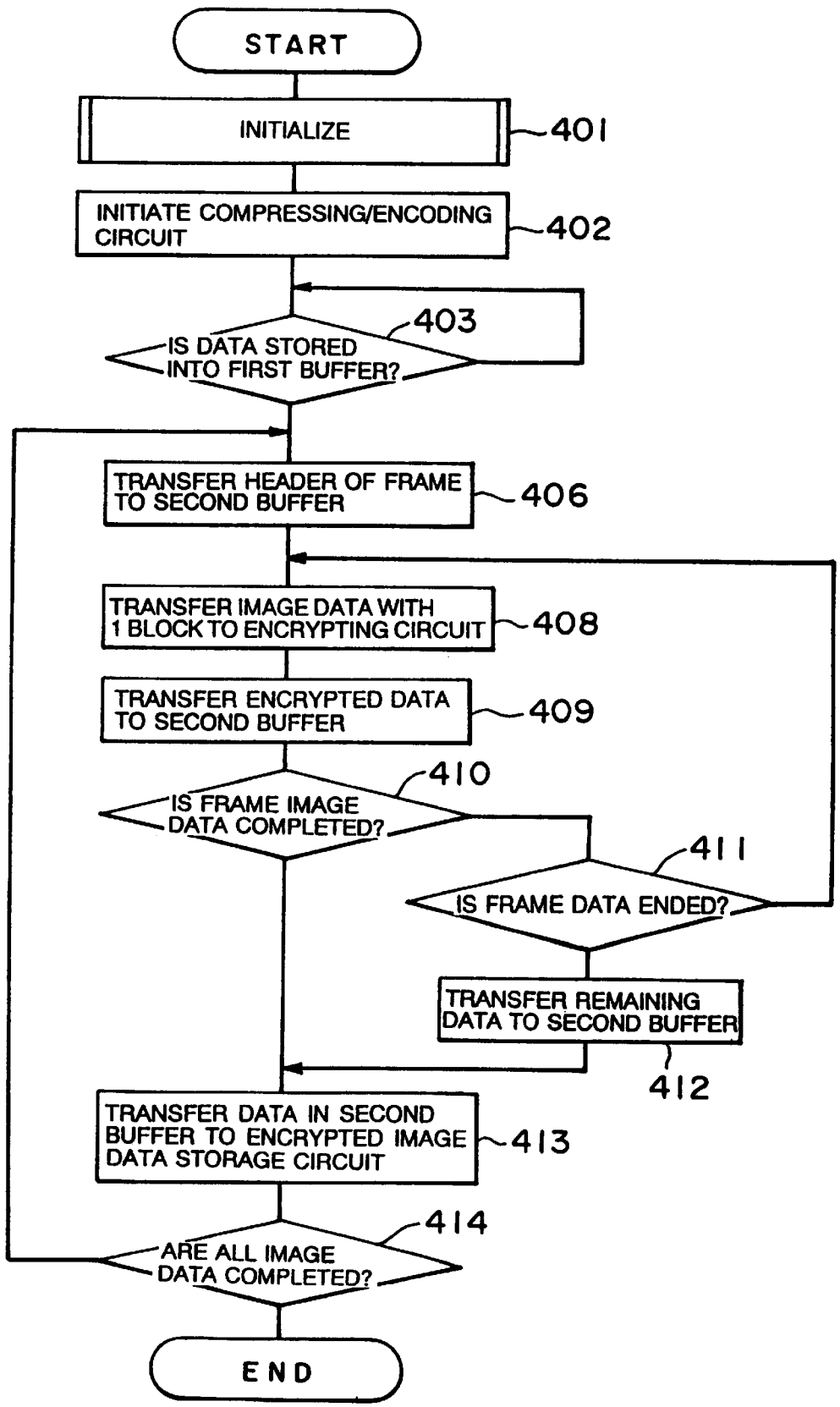
FIG. 4 is a flowchart indicating an encoding process in the embodiment.

The process returns to the flowchart of FIG. 4 and the compressing and encoding unit 2 is activated, when the initialization process is completed (Step 402).

The picture data is compressed and encoded by the compressing and encoding unit 2 to be stored into the first buffer 15 in order (Step 403).

Then, the control circuit 17 reads out the PID information from the PID storage unit 19 and generates the header information per frame to transmit the information to the second buffer 16 (Step 406).

Secondly, the picture data read out of the first buffer 15 is enciphered by the encipherment circuit 3 in order (Step 408)

and is written into the second buffer 16 as an enciphered data in order, when the process of one frame is completed (Step 409).

The second buffer 16 outputs the enciphered data of one frame to the enciphered picture data storage circuit 20, when the enciphering process of one frame mentioned above is completed (Step 410).

Then, the next data of one frame following the enciphered data of one frame is read out of the first buffer 15, and the above-mentioned process is repeated.

In the enciphering process mentioned above, a high-speed and safe algorithm (which can not be deciphered without the key information) should be applied to the encipherment circuit 3. For instance, the U.S. standard cryptography such as DES (Data Encryption Standard), FEAL (Fast Encryption Algorithm) and IDEA (International Data Encryption Algorithm) can be applied to the encipherment circuit. However, in the present invention, it is necessary to take such steps as not enciphering the part if the data to be enciphered does not reach the block length, when an enciphering method in which the data is processed per block is adopted, since there is the possibility that the frame length will be changed per bit.

Besides, as a processing for the partial data which does not reach the block length, a predetermined bit pattern can be inserted into the data until the data to be enciphered reaches one block length.

Besides, CBC mode and K bit CFB mode (K bit means a remaining enciphered bit) can be used at the same time. An initial vector of the CFB mode should be regarded as a final value of the CBC mode, when the above-mentioned method is adopted.

Further, a method for processing the data in one of 64-bit OFB mode, 1 bit OFB mode or 1 bit CFB mode also exists.

Besides, a method for using time information and sequence number included in a frame header as the initial vector for encipherment which will be required in the CBC mode, OFB mode and CFB mode also exists.

Figure 6:
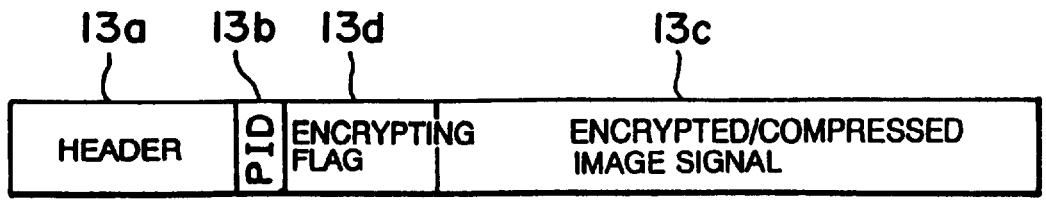
FIG. 6 is an explanatory diagram indicating a data construction of the embodiment.

In the present embodiment, FIG. 6 indicates a frame format in which the assembling has been completed by the enciphering picture data storage circuit 20.

The construction of one block of the frame format comprises an ID field which is composed of a header 13a, PID 13b and an enciphered flag, and a data field in which the enciphered and compressed picture data 13c is stored. An expansion control signal (synchronization signal) of the picture is recorded in the header 13a, and PID (Payload ID) of the enciphered and compressed picture data recorded in the data field is recorded in the PID 13b. A flag indicating whether or not the data recorded in the data field has been enciphered is recorded in the enciphering flag 13d. The data of the above-mentioned format is provided to the user in a state that the data is stored in CD-ROM or via the communication circuit.

Figure 13:
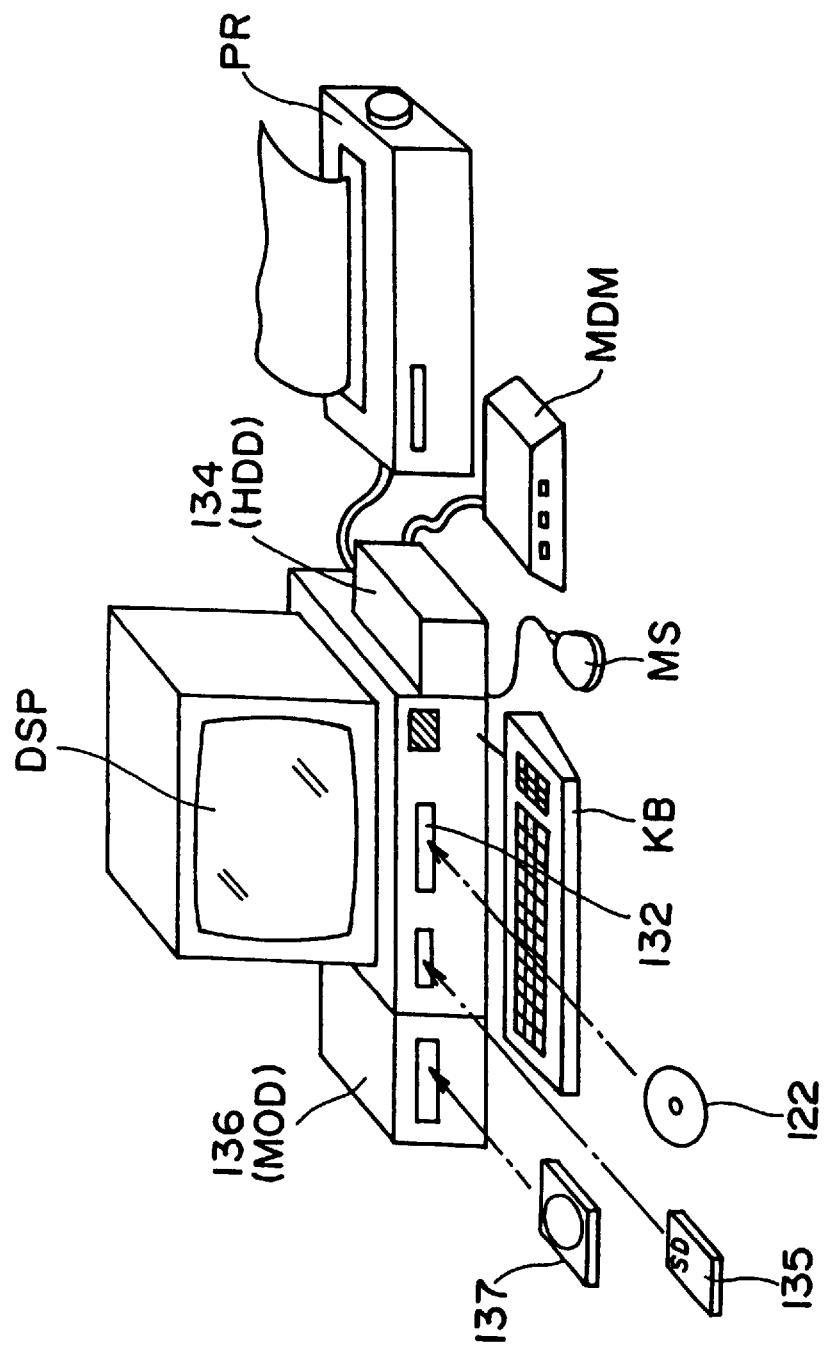
FIG. 13 is an explanatory diagram indicating a equipment construction of a reproducing device of the embodiment.

FIG. 13 is an explanatory diagram indicating an equipment construction of a reproducing device of the present embodiment.

The reproducing device body 131 is provided with a CD drive unit 132 on which a CD-ROM 122 can be mounted and a SD card 135 on which a SD card slot 133 which constitutes a decoding module mentioned later can be mounted, and the inside of the reproducing device body 131 is provided with a hard disk unit 134 in which a program and data can be stored.

Besides, the front of the reproducing device body 131 is provided with an infrared signal receiving unit (OCR) so that the ID for reproducing the data can be received from an infrared remote control which is unillustrated in FIG. 13.

Further, the reproducing device body 131 can be provided with a MO drive 136 for copying the enciphered data from the CD-ROM 122. A photo-electro magnetic disk 137 and a partial ROM disk (ROM medium whose portion can be rewritten) can be mounted on the MO drive 136.

Figure 7:
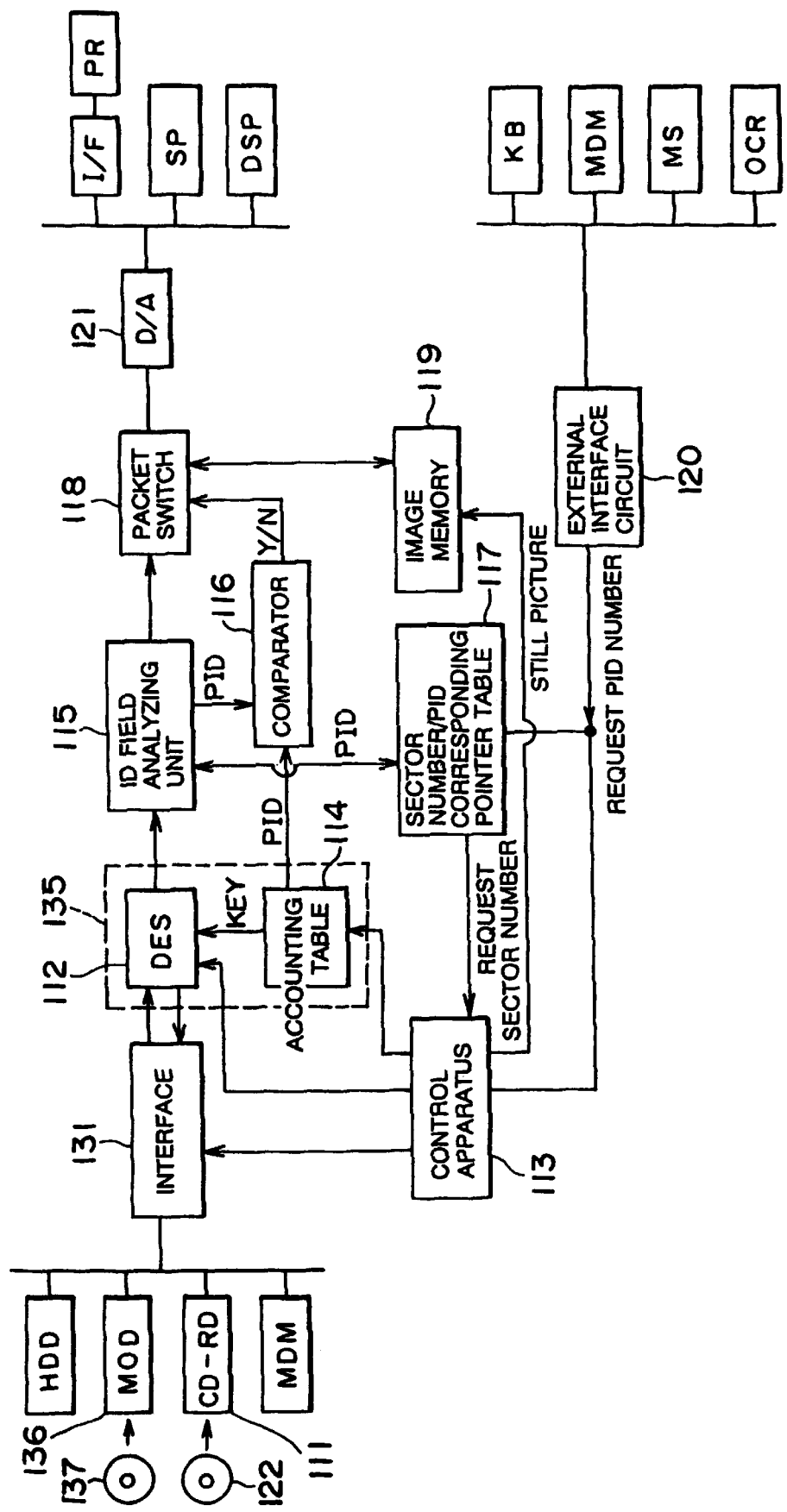
FIG. 7 is a block diagram indicating a construction of a compressed and encoded data reproducing device of the embodiment.

FIG. 7 is a functional block diagram of the reproducing device.

A hard disk drive unit (HDD), photo-electro magnetic disk drive unit (MOD), CD-ROM drive unit (CD-RD) and modem (MDM) are connected to an interface 131 so that the compressed and encoded data which has been enciphered as a magnetic recording medium, photo-electro magnetic recording medium, optical recording medium or communication data can be inputted thereto.

Figure 14:
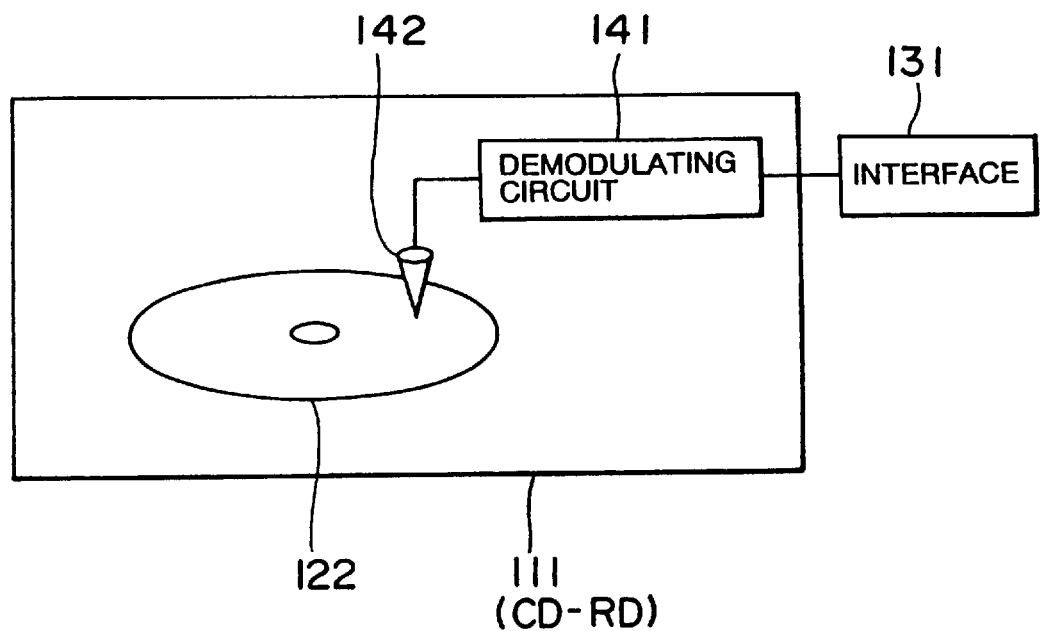
FIG. 14 is a diagram indicating a drive unit applied to the reproducing device of the embodiment.

A drive unit 111 using the CD-ROM 122 out of the above-mentioned various data input formats is shown in FIG. 14. The drive unit 111 has an optical pickup 142 for reading out the data recorded in the CD-ROM 122, and the data read out by the optical pickup 142 is demodulated by demodulation circuit 141 to be outputted to the interface 131 as an enciphered data.

Figure 15:
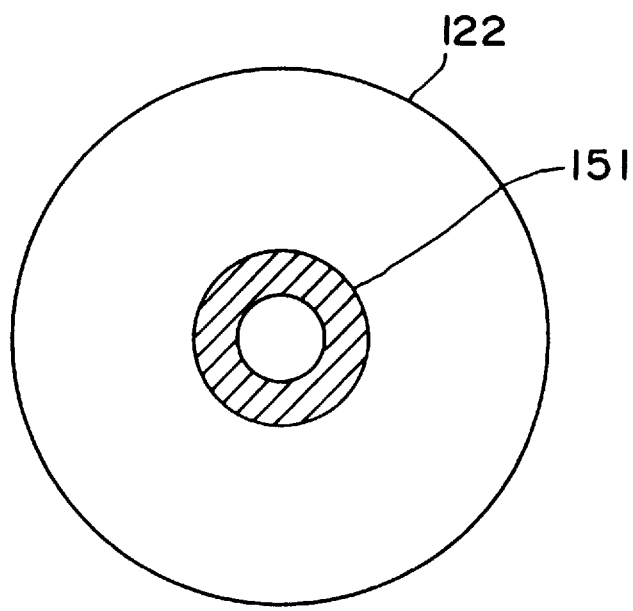
FIG. 15 is a diagram indicating a arrangement state of a corresponding record unit on CD-ROM of the embodiment.

Hereupon, the compressed and encoded (enciphered) moving picture data is recorded in the CD-ROM 122 used in the present embodiment, and the PID (for instance, the ID given per scene of movie) of the picture data and the sector number corresponding to the picture data are recorded in one part of the CD-ROM 122 as index parts. Namely, in the common reproducing method, it is not possible to recognize in which sector which part of data is stored without decoding and reproducing all of the data, since all of the moving picture data are enciphered. Accordingly, in the present embodiment, as shown in FIG. 15, one part of the CD-ROM is provided with a corresponding record unit 151 for making the ID for identifying the data and the sector number correspond to one another. The corresponding record unit 151 is scanned in an initial state in which the CD-ROM is mounted on the drive unit 111 so that the content of the unit will be copied to a sector number PID corresponding pointer table 117 mentioned later.

A DES 112 has a function for deciphering, namely, decoding the compressed and encoded data (enciphered data) which has been read out of the CD-ROM 122 via the drive unit 111.

Figure 8:
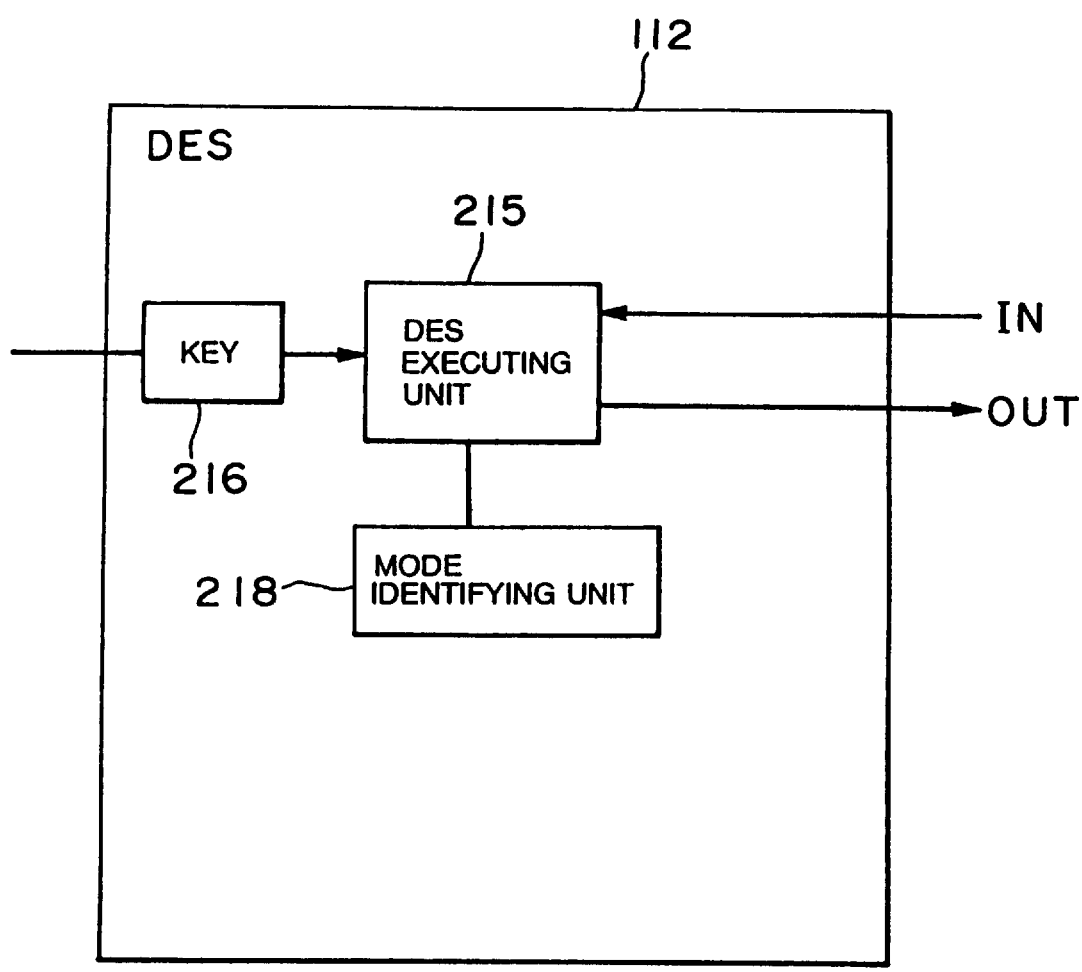
FIG. 8 is a block diagram indicating a construction of DES in the embodiment.

FIG. 8 indicates a schematic construction of the DES 112. As shown in FIG. 8, DES comprises a DES execution unit 215 and a function for decoding the input data (IN) in accordance with the algorithm obtained in the key information 216 and outputting it as an output data (OUT).

The DES execution unit 215 includes a mode identification unit 218, and the mode identification unit 218 has a function for selecting an optimum mode out of a plurality of DES modes according to the data format and giving the optimum mode to the DES execution unit 215.

Then, a typical logic circuit among the above-mentioned DES modes will be described.

Figure 9A:
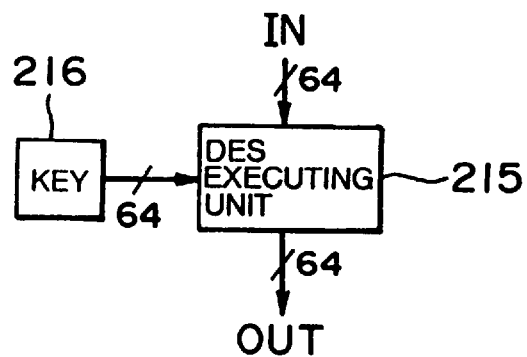
FIGS. 9(a)–9(d) are diagrams for describing various modes of DES in the embodiment.

FIG. 9(a) indicates a FCB basic mode which feedbacks enciphers 64-bit input data string as an output data string of 64 bits according to the key information of 64 bits in the DES execution unit 215.

Figure 9B:
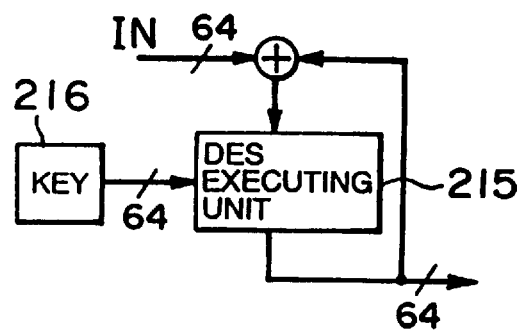

FIG. 9(b) indicates a CBC mode which feedbacks the enciphered input data string into the DES execution unit 215 for the second time after enciphering (or decoding) the input data string of 64 bits by the key information 216 of 64 bits in the DES execution unit 215. The CBC mode is a method for executing the feedback until all of the data is inputted in the above-mentioned way, and the method is suitable for processing the data such as a file.

Figure 9C:
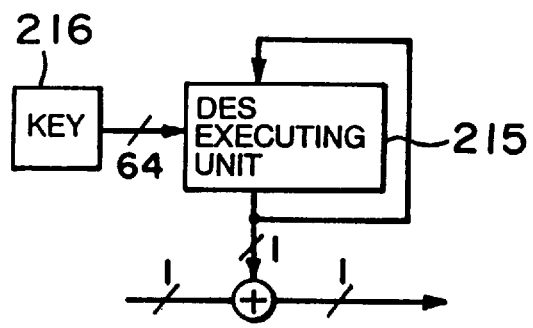

FIG. 9(c) indicates a OFB mode which is suitable for processing the communication data in which an error is apt to occur, the sound data in which one error has an important effect upon other data and the like.

Figure 9D:
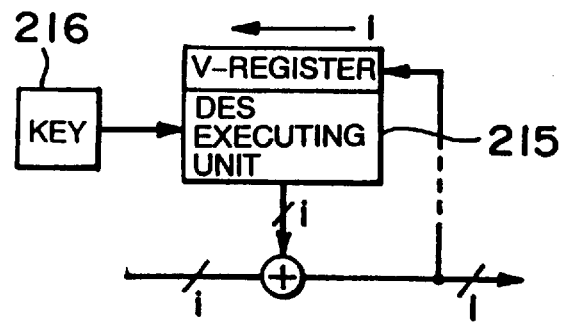

FIG. 9(d) indicates a CFB mode which is suitable for processing a self-synchronization type data.

The above-mentioned mode identification unit 218 analyzes the data format and the like to read out an optimum mode out of the modes stored in a mode table 220, and outputs the optimum mode to the DES execution unit 215. In the DES execution unit 215, the enciphering•decoding process is executed in accordance with the mode selected in the above-mentioned way.

Figure 10:
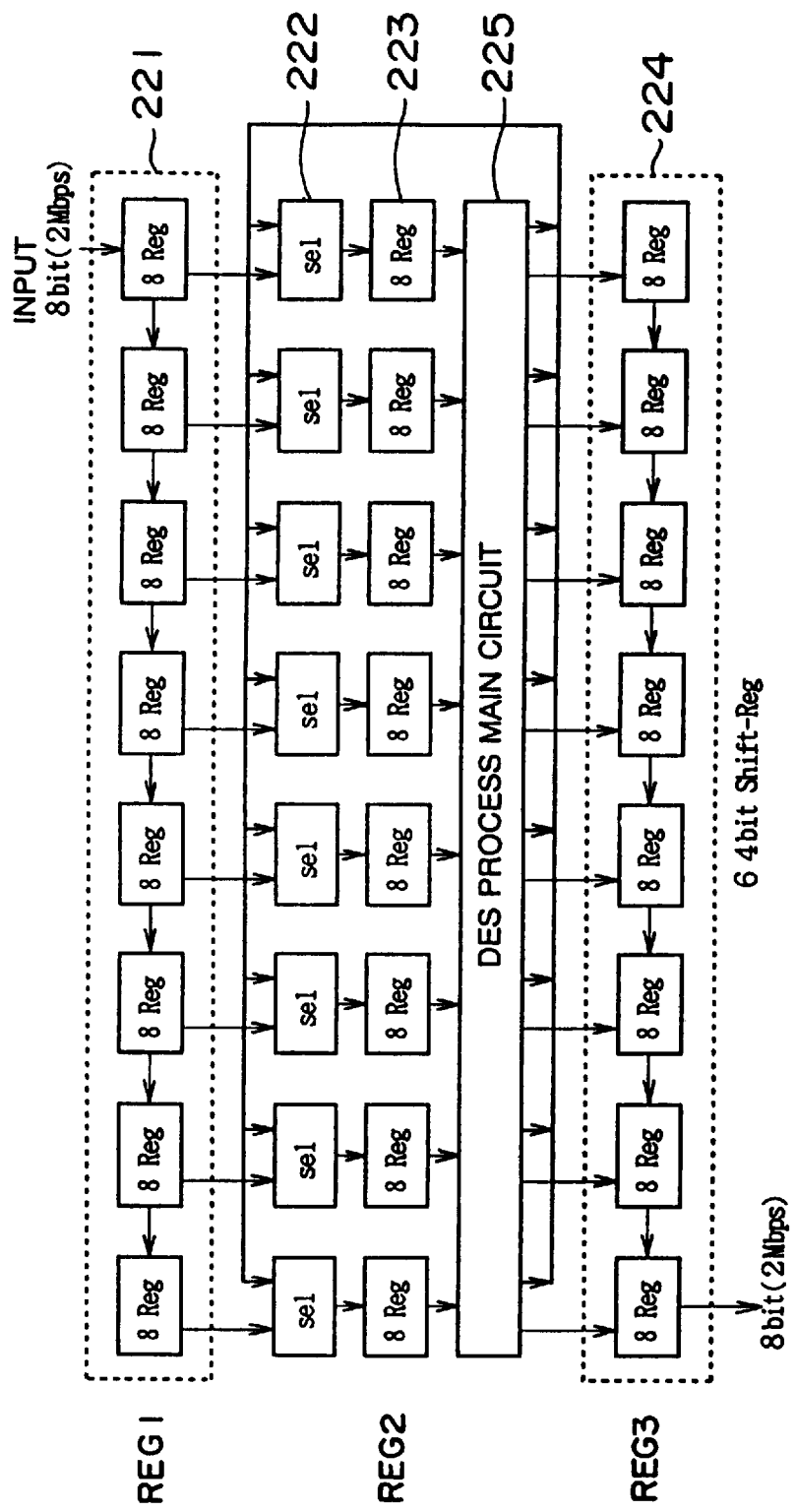
FIG. 10 is a block diagram indicating a construction for planing a speedup of DES execution unit in the embodiment.

FIG. 10 is a block diagram indicating a hardware construction of the DEA execution unit 215. In FIG. 10, eight registers of 8-bit structured registers are connected to the input side as a buffer for input, and a shift register (input register 221:REG 1) of 64 bits is arranged on the input side, and a plurality of selectors sel are arranged on the next stage. The selector sel is capable of inputting an output from a DES processing main circuit 225 mentioned later or an output from the shift register 221 selectively.

A 8-bit structured register 223 (REG 2) is arranged on the next stage of the selector sel, and the DES processing main circuit 225 is arranged on the further next stage. The DES processing main circuit 225 functions as the DES execution unit 215. Namely, all kinds of DES modes described in FIG. 9 are registered in the DES processing main circuit 225 as ROM, and a logic of the optimum DES mode is selected by the direction from the control unit 113 to execute the decoding process.

The output of the DES processing main circuit 225 is divided into the selector sel and an output register 224 (REG 3) as a buffer for output. Besides, the output of the output register 224 (REG 3) is used as an enciphered data or decoded data.

Figure 11:
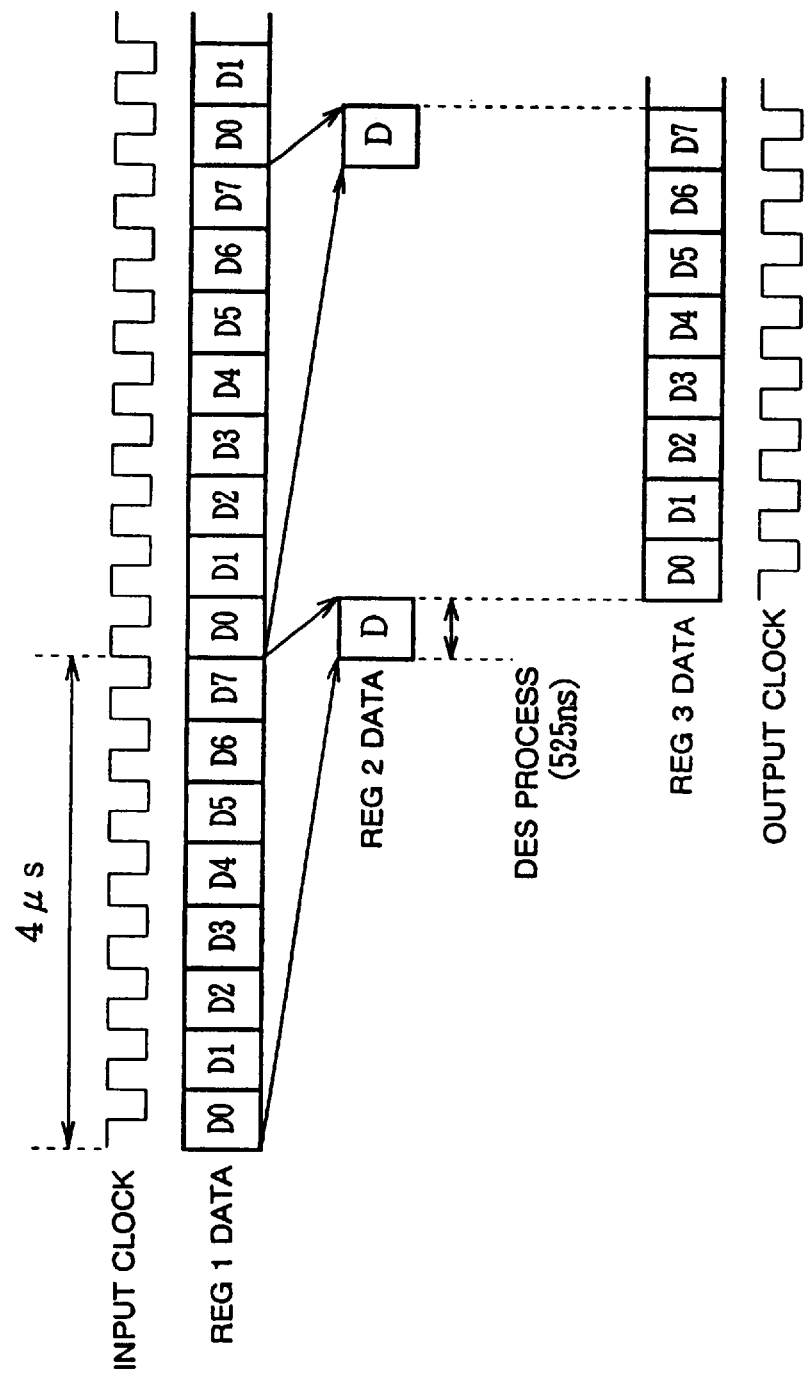
FIG. 11 is a diagram describing a process sequence of DES execution unit in the embodiment.

The sequence of the above-mentioned process is shown in FIG. 11.

In FIG. 11, the output of the input register 221 is DES-processed as an output from the register 223 in a first clock of the next cycle. Then, the DES-processed data is outputted from the output register 224 in the next clock. During the time when the data is outputted from the output register 224, the enciphered data of the next cycle is read out of the input register 221 in the input side.

As mentioned hereinbefore, in the present embodiment, the input of enciphered data and the output of decoded data can be executed independently and successively, since the reproducing device is provided with the input register 221 as a buffer for input and the output register 224 as a buffer for output. Accordingly, the decoding•enciphering process can be executed at a high speed compared with the case that the input and output are executed cyclically in the same way as the conventional DES.

A PID of the moving picture data and the like to which the user has previously paid the rental fee in a predetermined method and the balance of the rental fee are recorded in an accounting table 114.

For instance, the modulated accounting table 114 and DES 112 are included in IC card (SD card 135) and the like so that the user can not access the SD card 135 directly.

When the user wishes to rewrite the data content of the accounting table 114 included in the SD card 135, he has to bring the SD card 135 to a selling agent and the like and pay the predetermined fee. After that, the user can update the balance value in accordance with the fee that he has paid, or register the permitted PID additionally by using a rewriting device (unillustrated) installed in the selling agent.

An external interface circuit 120 functions as ID acquisition means, to put it concretely, a keyboard (KB), modem (MDM), mouse (MS), an infrared receiver (OCR) and the like are connected to the external interface circuit 120. The ID can be received from an external remote control (unillustrated) via the infrared receiver.

The sector number corresponding pointer table 117 is referred to detect the sector number corresponding to the PID, when the reproduction requesting PID is received from the external interface circuit 120.

Figure 12:
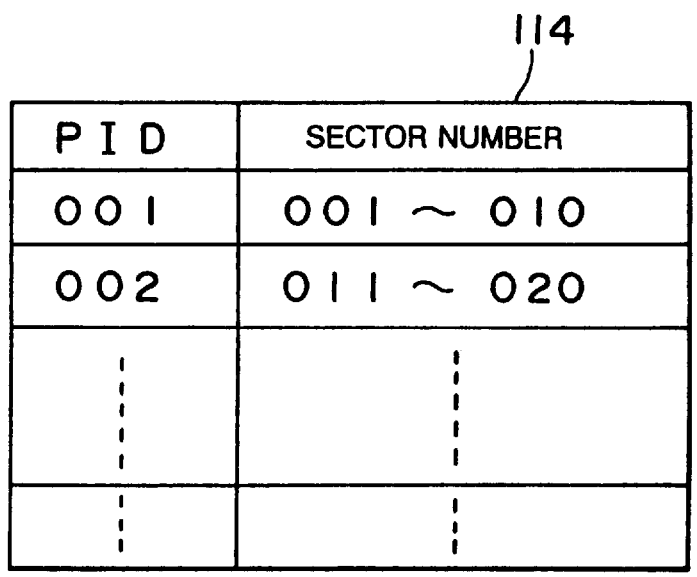
FIG. 12 is an explanatory diagram indicating a content of a sector number PID corresponding pointer table of the embodiment.

FIG. 12 indicates a table construction of the sector number PID corresponding pointer table 117. When the CD-ROM 122 is mounted on the drive unit 111 to read out the corresponding record unit 151, the readout data is copied into the table 117 to update the content of the readout data.

A payload ID and a sector number corresponding to each of the payload IDS are registered in the table 117.

When the sector number PID corresponding pointer table 117 is accessed to retrieve the sector number in accordance with the reproduction requesting PID transmitted from the outside, the control unit 113 directs the drive unit 111 to read out the sector.

First of all, an ID field of the data corresponding to the read out sector is analyzed by ID field analysis unit 115.

The ID field analysis unit 115 extracts the ID field out of the read out decoded data and extracts a PID out of the ID field.

A comparator 116 has a function for comparing the PID extracted by the ID field analysis unit 115 with the PID read out of the accounting table 114. Namely, it is determined whether or not the PID permitted to the user in the accounting table 114 conforms with the PID extracted from the ID field analysis unit 115, and the comparator 116 outputs an ON signal to a packet switch 118, only when the permitted PID conforms with the extracted PID.

The packet switch 118 has a function for switching the data outputted to a data conversion unit 121, and in the present embodiment, the data can be switched to the state that the data is not outputted, the state that the data decoded by DES is outputted and the state that a still picture stored in a picture memory 119 is outputted respectively.

The data conversion unit 121 is composed of digital/analog converters (D/A converters) and converts a digital data read out of the CD-ROM 122 into an analog signal such as a NTSC signal, and the data conversion unit 121 is connected to a printer (PR) and the like via a display unit (DSP), speaker (SP) or an interface circuit (I/F).

In the present device construction, first of all, the reproducing device will be in a boot state if the CD-ROM 122 is mounted on the drive unit 111, then, the corresponding record unit 151 of the CD-ROM 122 is read out by the direction of the control unit 113 and the content of the corresponding record unit 151 is copied into the sector number PID corresponding pointer table 117.

The compressed and encoded (decoded) data block which has been read out of the CD-ROM 122 is decoded by the DES 112 in order, when the CD-ROM 122 is reproduced.

In the ID field analysis unit 115, the readout data are analyzed to extract a PID 13b, and the PID is notified to the comparator 116. The accounting table 114 notifies the comparator 116 of the PID of the data which is permitted to be reproduced in parallel with the process.

In the comparator 116, the packet switch 118 is opened only when the PID of the coded data conforms with the PID which has been permitted in the accounting table 114. By these actions, the data which has been read out of the data field to be decoded by the DES 112 is outputted via the display unit (DSP).

On the other hand, when the comparison results in the comparator 116 has not been conformed, the packet switch will be in a OFF state and the still pictures stored in the picture memory 119, for instance, the picture data calling a user's attention will be outputted through the display unit (DSP), since the data is a data which is not permitted to be reproduced.

Further, when the external interface circuit 120 directs a frame forwarding for incrementing the PID and the like via the infrared remote control (unillustrated), for instance, the sector number is added per 10 sectors to direct the drive unit 111 to execute the readout. By these actions, the high speed fast-forward moving picture by the frame forwarding can be realized.

Besides, it is possible to reproduce the moving picture to the reverse direction and reproduce the moving picture from a random position in accordance with the PID.

According to the present embodiment, the data is managed by the PID, the index unit in which the corresponding relation between the PID and the sector number is recorded has been installed on the CD-ROM 122 in which the compressed and encoded (enciphered) data is recorded, and the table which is capable of copying the index unit as it is has been installed on the reproducing device side so that the sector number can be retrieved from the PID by referring to the table when the data is accessed. By these actions, it has become possible to execute the random search and special reproductions regarding the PID as an identification standard, even if all of the data are compressed and encoded.

What is claimed is:

1. A data reproducing system for outputting data to which a block number is given, per block, to reproduce the data, comprising:

ID acquisition means for acquiring ID information given to a data line comprising a plurality of blocks from outside of said acquisition means;

ID-block corresponding means for registering a corresponding relation between the ID information and the block number and detecting a block number corresponding to the ID information acquired by said ID acquisition means;

readout control means for directing readout of data in accordance with the block number obtained by said ID-block number corresponding means;

output control means for controlling an output of the data read out by said readout control means; and permitted information management means for registering ID information of a frame of data which has been permitted to be reproduced by key information.

2. A data reproducing system according to claim 1, further comprising:

decoding means for decoding the input data which has been enciphered or compressed and encoded; and inherent key information for decoding the data which has been enciphered or compressed and encoded for said decoding means.

3. A data reproducing system according as claimed in claim 1, further including:

comparison means for comparing the ID information which has been registered in said permitted information management means with the ID information of the readout data, wherein said output control means outputs the readout data in accordance with the coincident information from said comparison means.

4. A data reproducing system as claimed in claim 2, further comprising:

key storage means for storing the key information, wherein said decoding means acquires the key information from said key storage means.

5. A data reproducing system as claimed in claim 1, further comprising:

accounting process means for executing an accounting when the readout data is outputted, wherein accounting information is registered in said permitted information management means.

6. A data reproducing system as claimed in claim 1, further comprising:

a convertible type recording medium in which the data is accessed by a corresponding sector number, wherein the ID information is given per frame and includes a plurality of correspondingly numbered sectors, and wherein corresponding relation information indicating a corresponding relation between the sector numbers and the ID information is registered;

a drive unit for reading out the corresponding relation information indicating a corresponding relation between the sector number and the ID information from the convertible type recording medium; and initialization means for registering the corresponding relation information read out of the drive unit in said ID-block number corresponding means.

7. A disk medium, comprising:

an index unit in which an information storage region is divided into a plurality of sectors having corresponding sector numbers therein;

a permitted information management unit to register ID information of a frame of an input data reproduced; and a recording filed for recording data, wherein an ID information given per frame consisting of a plurality of sectors is recorded in said index unit.

8. A data reproducing method for reproducing and outputting input data which has been assigned a corresponding block number and then inputted, comprising the steps of:

acquiring ID information which has been given per frame that includes a plurality of blocks;

detecting a block number corresponding to an outside ID information from a corresponding table indicating a corresponding relation between the ID information and the block number;

reading out the data in accordance with the block number obtained from the corresponding table;

checking whether the ID information of the readout data is an ID information which has previously been given permission to be outputted;

outputting the readout data to a data outputting means when the ID information has previously been given permission to be outputted; and permitted information management means for registering ID information of a frame of data reproduced.

9. A data reproducing method as claimed in claim 8, further comprising the step of:

updating an accounting information when the readout data is outputted to the data outputting means.

* * * * *